United States Patent [19]

Ohyabu et al.

[11] 4,430,356

[45] Feb. 7, 1984

[54] METHOD FOR PRODUCTION OF FORMED FOOD PRODUCT OF MICROFIBRILLAR MILK PROTEIN

[75] Inventors: Shuzo Ohyabu; Syuji Kawai; Keiji Matsumura, all of Kurashiki, Japan

[73] Assignee: Kuraray Company, Ltd., Kurashiki, Japan

[21] Appl. No.: 366,731

[22] Filed: Apr. 8, 1982

[30] Foreign Application Priority Data

Apr. 13, 1981 [JP] Japan .................................. 56-56166
Aug. 10, 1981 [JP] Japan ................................ 56-125777

[51] Int. Cl.$^3$ ............................................... A23J 3/00
[52] U.S. Cl. .................................. 426/574; 426/580; 426/657; 426/802
[58] Field of Search ............... 426/573, 574, 582, 657, 426/802, 580

[56] References Cited

U.S. PATENT DOCUMENTS

| 4,165,392 | 8/1979 | Kawai et al. | 426/657 |
| 4,197,322 | 4/1980 | Middleton | 426/582 X |
| 4,239,784 | 12/1980 | Guiraud et al. | 426/657 X |
| 4,251,567 | 2/1981 | Ohyabu et al. | 426/802 X |
| 4,275,084 | 6/1981 | Ohyabu et al. | 426/802 X |

Primary Examiner—Robert A. Yoncoskie
Attorney, Agent, or Firm—Jones, Tullar & Cooper

[57] ABSTRACT

A method for the production of formed food products of a microfibrillar milk protein, which comprises mixing an aqueous gel of a milk protein comprising mainly calcium caseinate with a specific amount of dehydrating agent (e.g. sodium chloride) and a specific amount of a dispersant (e.g. dextrin, sodium caseinate) and optionally fats and oils at a specified temperature and forming the mixture at the same temperature range into the desired shapes. The formed food products are obtained in various states of from comparatively soft products (e.g. imitation cheese) to comparative hard products (e.g. imitation jerky) by controlling the temperature in the mixing and forming steps and/or the amounts of the dehydrating agent and dispersant.

13 Claims, 1 Drawing Figure

METHOD FOR PRODUCTION OF FORMED FOOD PRODUCT OF MICROFIBRILLAR MILK PROTEIN

The present invention relates to an improved method for the production of a formed food product of a microfibrillar milk protein which can maintain its highly orientated fibrillar bundle for a long period of time by keeping it at room temperature or a temperature of lower than 10° C.

With the recent rapid increase of population in the world, the utilization of vegetable proteins such as soy bean protein, various seed proteins, wheat protein, etc., animal milk proteins such as casein, skim milk, whey protein, etc., and other animal proteins such as egg white, blood proteins, etc. which have hitherto been not much utilized as foodstuffs is being reexamined. Particularly, it has been proposed to utilize soy bean protein and casein as foodstuffs, after forming them into a fibrillar structure and combining them with various additives such as meat-like seasoning or flavor, fats and oils, emulsifiers, pH regulators, colorants, or the like in order to make them fit to practical use, followed by forming the fibrillar protein composition into the desired various shapes.

The present inventors also had provided a formed food product of microfibrillar milk protein having excellent stability to hot water cooking and high tensile elongation which is produced by treating an aqueous solution of a milk protein comprising mainly casein, skim milk, etc. with a polyvalent metallic ion, treating the resulting micellar colloid with a milk protein-coagulating enzyme to form a gel composition, orientating and fibrillating the gel composition by drawing, followed by stabilizing by dipping and acid bath and then dipping in a boiling saline bath for a long period of time (cf. Japanese Patent Publication (unexamined) No. 143550/1979) and further had provided a formed food product having excellent tolerance to cooking and meat-like texture which is produced by incorporating the fibrillar composition of milk protein obtained above with various additives, followed by forming into the desired shape with heating (cf. Japanese Patent Publication (unexamined) No. 81548/1980. The formed food products thus obtained comprise mainly milk protein and hence have an excellent balance of amino acids, excellent digestibility, excellent stability to hot water cooking and also excellent texture without the soy bean odor found in soy bean protein. Accordingly, these formed food products of microfibrillar milk protein are used as a food stuff material.

However, the known method has some drawbacks as mentioned in the following items (a) to (d) and can be improved by simplifying the steps, improving process efficiency and lowering cost:

(a) To stabilize the microfibrillar formed product by dipping in an acid bath as in the known method, it is necessary to increase the specific surface area of the aqueous protein gel as large as possible in order to rapidly diffuse and penetrate the acid solution into the formed product. For example, when the microfibrillar structure is formed by spinning the gel composition, the monofilaments should have as small a diameter as possible. Further when a sheet-like product is formed, it should have as small a thickness as possible. As a result, the forming steps become complicated and the process efficiency is lowered.

(b) The aqueous protein gel has a pH of about 7 (neutral) before the stabilization in an acid bath, but the microfibrillar formed product after stabilization in an acid bath has a pH of less than 1. On the other hand, the subsequent treatment in a saline bath should be done at a pH of 2.5 or higher in order to improve the heat resistance and tensile elongation of the product. This requires neutralizing the product to the desired pH range after stabilization in an acid bath. However, the neutralization operation is difficult because the formed product has an extremely large specific surface area as mentioned in above item (a), and further, low molecular weight peptide components a low molecular weight are largely lost during the operation, which results in decreased yield of the desired product.

(c) The treatment in a saline bath should be done at about 110° C. for several hours, and hence, the peptides contained in the product are deteriorated and decomposed during the long treatment time being converted into oligopetides which are dissolved into the saline bath, which also results in decreased yield of the desired product.

(d) According to the method as disclosed in Japanese Patent Publication (unexamined) No. 81548/1980, wherein the desired formed product is formed with heating, the forming step with heating should not be done for a long period of time because the formed product has usually has a low thermal conductivity.

Under the circumstances, the present inventors have intensively studied to invent an improved method of forming the desired food product of microfibrillar milk protein without taking such complicated steps as "preparation of an aqueous milk protein gel"→"formation of microfibrillar structure"→"stabilization in an acid bath"→"neutralization"→"treatment in a saline bath"→"forming into the desired shape with heating". As a result, it has been found that the desired formed food product can be directly produced from the aqueous milk protein gel by forming the gel into the desired shape in the presence of a specific amount of a specific dehydrating agent and a dispersant without the necessity of performing the steps of the stabilization in an acid bath, neutralization and treatment in a saline bath.

The present inventors have found that when an aqueous milk protein gel is mixed and kneaded together with a specific amount of a compound having a strong dehydrating action such as sodium chloride (a dehydrating agent), the milk protein (mainly calcium caseinate) contained in the aqueous gel composition is converted into a three-dimensional net-like microfibrillar structure with release of water, and when the fibril-containing aqueous gel is strongly drawn by hand, the microfibrils are orientated to form a microfibrillar formed product, but the microfibrillar structure is unstable. As a result of further intensive study by the present inventors, it has been found that when the aqueous gel is mixed with a specific amount of a specific dispersant (e.g. dextrin, sodium caseinate) and optionally a fat and oil in addition to the dehydrating agent (e.g. sodium chloride), it can be formed into a stable microfibrillar formed product (e.g. imitation cheese).

There are some known methods for producing various imitation cheeses from a milk protein. For example, an imitation mozzarella cheese is produced by treating a homogeneous mixture of acid casein and fats and oils with calcium chloride, separating the resulting curds, and combining the curds with additives such as cheese flavor, pigments for food, and sodium chloride (in one working example, sodium chloride ($0.34 \times 10^{-3}$ mol per 1 g of protein composition) and starch (0.02 g per 1 g of protein composition) or the like are added as additives (cf. Japanese Patent Publication (unexamined) No. 68349/1981). Further, a simulated cheese is produced by mixing and reacting a mixture of an aqueous solution of an acid and powdered casein with calcium hydroxide to form calcium caseinate, and mixing a fat with the product obtained above, optionally together with ungelatinized flour (in the working examples, sodium chloride etc. ($0.23 \times 10^{-3}$ mol per 1 g of protein composition) and tapioca flour (0.03 g per 1 g of protein composition) or the like are added as additives) (cf. U.S. Pat. No. 3,922,374). However, in these methods, the additives such as sodium chloride are used in a very small amount and the products produced therein have no microfibrillar structure and are essentially different from the formed food product of microfibrillar milk protein of the present invention.

An object of the present invention is to provide an improved method for the production of a formed food product of a microfibrillar milk protein by a simpler steps. Another object of the invention is to provide a formed food product of a microfibrillar milk protein having a stable microfibrillar structure without employing complicated steps of stabilization in an acid bath and a saline bath. A further object of the invention is to provide new types of foods in various states ranging from comparative soft products (e.g. imitation cheese) to comparative hard products (e.g. imitation jerked meat=imitation jerky). These and other objects and advantages of the present invention will be apparent from the following description.

According to the present invention, the desired formed food product of a microfibrillar milk protein is produced by mixing an aqueous gel comprising mainly calcium caseinate with a specific amount of a dehydrating agent and a specific amount of a dispersant at a specified temperature and forming the mixture at the same temperature range into the desired shape.

The starting aqueous gel of a milk protein includes all gels of known milk proteins, such as cow milk protein, skim milk protein, caseins including all known caseins obtained, for example, by precipitating from an aqueous skim milk solution with acids, rennet, etc. The aqueous gel may contain a small amount of other vegetable proteins provides that a milk protein (calcium caseinate) is the main component. The aqueous gel of a milk protein can be prepared by all conventional methods, for example by adding a polyvalent metallic ion (e.g. calcium chloride) to an aqueous solution of casein to produce a micellar colloid and treating the micellar colloid with a milk-coagulating enzyme (e.g. milkozyme); by adding calcium chloride to an aqueous solution of casein having a pH 6.3-6.6 at 45° to 65° C., wherein calcium chloride is used in an amount of 0.8 to 6.0 % based on the weight of casein (calculated as $Ca^{++}$), and stirring the mixture for 5 to 60 minutes; by adding a calcium compound to cow milk, skim milk, process milk, etc. at 0° to 25° C. wherein the calcium compound is used in an amount of 5.0 to 9.5% based on the weight of casein, regulating the pH of the mixture in the range of 4.9-5.6, and heating the mixture at 45° to 65° C.; and by subjecting an aqueous solution of casein to reduction, and treating the resulting mixture with calcium chloride. Alternatively, the aqueous gel of a milk protein may also be prepared by dissolving a rennet casein in water in the presence of a phosphate (e.g. sodium phosphate) or an organic acid salt (e.g. sodium citrate).

The aqueous gel of a milk protein contains latently three-dimensional structure or microfibrillar structure owing to mutual coagulation of calcium caseinate micell. Accordingly, when the gel is heated at about 40° C. or higher, it shows spinnability (while it does not show any spinnability when heated at lower than 40° C.), and when the spinnable gel is subjected to external shear, for example by rapidly drawing, the latent microfibrillar structure is actualized to form a tape-like formed product (the microfibrillar structure is observed by tearing the product). However, when the microfibrillar formed product is allowed to stand relaxed even for a short period of time (e.g. 5 minutes), the actualized fibrillar structure again becomes latent, returning to a homogeneous gel composition having non-orientated, latent fibrillar structure. This phenomenon is also observed when the tape-like formed product is kept at lower than 40° C. for a long period of time without applying tension thereto. Thus, it is impossible to obtain the desired stable microfibrillar formed product directly from an aqueous gel of a milk protein without subjecting the product to stabilization in an acid bath and treatment in a saline bath.

Since the microfibrillar structure produced by adding an external shear to an aqueous gel of a milk protein (optionally with heating) is unstable and not practical, the present inventors have tried to add a dehydrating agent to the aqueous gel, followed by forming the gel into the desired formed product with heating, by which there is obtained a formed product having microfibrillar structure which can be maintained for a long period of time when kept at about 10° C. or lower while preventing evaporation of moisture, which is the similar condition usually used in the conventional distribution system of foods. The microfibrillar formed product thus obtained can be torn in the direction of orientation and is useful as a new type of food. However, when a dehydrating agent having a strong dehydrating action such as sodium chloride is used alone, the aqueous gel is dehydrated to an excess degree and peptides having a low molecular weight contained in the gel composition and also sodium chloride are dissolved in the released water, and further, the resultant formed product is too hard and is difficult to chew. The present inventors have found that the drawback as above-mentioned can be eliminated by mixing the aqueous gel of a milk protein with a specific amount of a specific dispersant in addition to the dehydrating agent, by which the desired stable formed food product of a microfibrillar milk protein can be obtained without subjecting the product to stabilization in an acid bath and treatment in a saline bath as in the conventional method.

The dehydrating agent used in the present invention includes sodium salts, such as sodium chloride, sodium citrate, sodium succinate, sodium chondroitin sulfate, sodium acetate, sodium tartrate, sodium carbonate, saccharin sodium salt, sodium lactate, sodium fumarate, sodium propionate, sodium sulfate, or sodium malate; calcium salts, such as calcium chloride, calcium citrate, calcium glycerophosphate, calcium gluconate, calcium stearyllactate, calcium carbonate, calcium lactate, calcium pantothenate, calcium propionate, or calcium sulfate; magnesium salts, such as magnesium chloride, magnesium carbonate, or magnesium sulfate; potassium salts, such as potassium sorbate, potassium carbonate, or potassium chloride; iron salts, such as ferric chloride, or ferric lactate; saccharides including all monosaccharides, disaccharides and oligosaccharides; sugar alcohols, such as sorbitol, mannitol, or dulcitol; amino acids and their sodium salts; lecithin; glycerin; propylene glycol; ethyl alcohol; or the like. Among these, particularly preferred compounds in view of the excellent dehydrating effect and fibril-forming ability are sodium chloride, calcium chloride, calcium lactate, magnesium chloride, all monosaccharides, disaccharides and oligosaccharides, all sugar alcohols, all amino acids and their sodium salts, and lecithin.

These dehydrating agents are used in a specific amount of $0.5 \times 10^{-3}$ to $5.5 \times 10^{-3}$ mol, preferably $0.5 \times 10^{-3}$ to $4.0 \times 10^{-3}$ mol, per 1 g of an aqueous gel of a milk protein (having a water content of 65% by weight). The most suitable amount may vary within this range with the amount and kind of the dispersant to be added together, with the temperature in the mixing and subsequent forming steps, and also with the desired quality and kind of the final product. When the dehydrating agent is used in an amount of less than $0.5 \times 10^{-3}$ mol per 1 g of an aqueous gel of a milk protein, the actualization of fibrillar structure is insufficiently accomplished, giving a formed product having inferior microfibrillar structure, and on the other hand, when the amount of the dehydrating agent is over $5.5 \times 10^{-3}$ mol, the aqueous gel of a milk protein is dehydrated and coagulated in an excess degree, giving a formed product which is too hard and which has inferior orientation.

The dispersant used in the present invention together with the dehydrating agent in order to moderate the hardness of the formed product includes all compounds which do not show any dehydrating action but can absorb water released from the aqueous gel and further can uniformly disperse into the microfibrils which are strongly coagulated due to loss of combined water to separate the microfibrils each other and thereby can maintain plasticity of the product. Thus, the dispersant used in the present invention may also be called a "water absorbing agent". The dispersant may be in any form, but is preferably in the form of a powder. Suitable examples of the dispersant are dextrin, starches, powdery cellulose, sodium alginate, gums (e.g. gum arabic, xanthane gum, powdery konjak mannan), sodium caseinate, powdery egg white, isolated soy bean, gluten, blood plasma powder, red blood corpuscle powder, pectin, carboxymethyl cellulose, terra alba, talc, diatomaceous earth, whey alubumin, whey globulin, gelatin, or the like. Among them, particularly preferred compounds are dextrin, starches, powdery cellulose, sodium alginate, gums, sodium caseinate, powdery egg white, isolated soy bean, gluten, blood plasma powder, and red blood corpuscle powder.

These dispersants are used in a specific amount of 0.05 to 0.6 g, preferably 0.15 to 0.5 g, per 1 g of an aqueous gel of a milk protein (as in water content of 65% by weight). The most suitable amount may vary within this range with the amount and kind of the dehydrating agent to be added together, with the temperature in the mixing and subsequent forming steps, and also with the desired quality and kind of the final product. When the amount of a dispersant is less than 0.05 g per 1 g of an aqueous gel of a milk protein, it cannot show sufficient water absorbing effect, which results in the production of a product which is too hard like in the case of using a dehydrating agent alone. On the other hand, when the amount of a dispersant is over 0.6 g, the final formed product has undesirably inferior orientation and microfibrillar structure.

In addition to the dehydrating agent and dispersant, the composition of the present invention may optionally be combined with fats and oils in order to improve the chewability of the formed product and also the watery taste thereof, by which there is obtained a food product having good body. The fats and oils include all fats and oils useful as a food additive. Suitable examples of the fats and oils are milk fats, tallow, lard, soy bean oil, cocoa butter, palm oil, palm kernel oil, coconut oil, or hardened oils of these oils. Fish fats, whale fats, cotton seed oil are also usable. These fats and oils may be used in an amount of not more than 0.8 g (i.e. 0 to 0.8 g), preferably 0.1 to 0.5 g, per 1 g of the aqueous gel of a milk protein.

These dehydrating agents, dispersants and also optionally fats and oils may be incorporated separately, but may optionally be used in the state of pre-mixture thereof, which is commercially or naturally available as a food or food additive, wherein the specified amounts of the dehydrating agent and the dispersant and also optionally the fats and oils are contained. Suitable examples of the pre-mixture are cheese powder, chocolate powder, cocoa powder, various fruit juice powders, yogurt powder, various meat-like flavoring materials, various fishes and shell fishes flavoring materials, skim milk powder, partially defatted skim milk powder, whole milk powder, whey powder, wheat powder, corn powder, rice powder, powdery caramel, or the like.

The formed product of a microfibrillar milk protein of the present invention can be prepared in the following steps.

Firstly, the dehydrating agent and dispersant and optionally fats and oils are added to an aqueous gel of a milk protein in the specified amount as mentioned hereinbefore. When fats and oils are added, they may be added together with the dehydrating agent and dispersant, or may be added in the step of preparation of the aqueous gel. These may also be added in the form of a pre-mixture as mentioned above. The addition and mixing is usually carried out at a temperature of not higher than 120° C., preferably 40° to 120° C., with stirring.

The resulting mixture thus obtained is then formed into various shapes depending on the desired final products, for example, in forms of yarn-like, string-like, columnar filmy, sheet-like shapes, by solidifying or pressing in the desired various molds in a conventional manner. The forming is usually carried out at the same temperature range as in the above addition and mixing step.

The temperature in the above addition, mixing and forming steps is in principle depending on the desired qualities (e.g. water content, hardness, etc.) of the final food products. That is, when a soft food product such as imitation cheese (e.g. string cheese) is required, the mixing and forming are carried out at a comparatively lower temperature such as lower than 80° C., but on the other hand, when a comparatively hard food product such as jerked meat (jerky) is required, the mixing and forming are carried out at a comparatively higher temperature such as 80° to 120° C. The temperature may also vary with the amount of a dehydrating agent. For example, when a dehydrating agent is used in an amount of $0.5 \times 10^{-3}$ to $2.6 \times 10^{-3}$ mol, preferably $0.5 \times 10^{-3}$ to $1.9 \times 10^{-3}$ mol, per 1 g of an aqueous gel of a milk protein in order to produce an imitation cheese (e.g. string cheese), the mixing and forming are usually carried out at a temperature of 40° to 80° C. When a dehydrating agent is used in an amount of $1.9\times10^{-3}$ to $5.5\times10^{-3}$ mol, preferable $2.2\times10^{-3}$ to $4.0\times10^{-3}$ mol, per 1 g of an aqueous gel of a milk protein in order to produce a hard food product such as jerky, the mixing and forming are usually carried out at a temperature of 80° to 120° C., preferable 85° to 100° C.

The excellent properties of the formed food product of the present invention were experimentally confirmed by the following experiments, wherein various kinds of dehydrating agents, dispersants and fats and oils were used in various amounts and the mixing and forming steps were carried out at various temperatures.

Experiment 1

An about 20% aqueous casein solution (pH: 7.7, 500 g) was maintained at 55° C. and thereto was added a calcium mixture (as a polyvalent metallic ion) of anhydrous calcium chloride (4g) and calcium lactate dihydrate (14 g), and the mixture was stirred at the same temperature to give a micelle of calcium caseinate. A protease (milkozyme, 0.11 g) was added to and uniformly dispersed in the micelle at the same temperature as above, and the mixture was maintained at the same temperature for 60 minutes to give an aqueous gel of a milk protein (about 270 g, water content: 65% by weight).

The aqueous gel thus obtained (100 g) was heated to 55° C. and thereto was added slowly a mixture of sodium chloride (10 g (0.17 mol), as a dehydrating agent) and dextrin (10 g, as a dispersant) which were previously homogeneously mixed with careful attention so as not to form a mass of the mixture. With the addition of the mixture, the latent microfibrillar structure was rapidly actualized in the gel and the released water was well absorbed with dextrin to give a product having an excellent elasticity (wherein dextrin was uniformly dispersed within the gaps between microfibrils thus formed). The mixed gel containing actualized microfibrillar structure was drawn by hand at 55° C. to give a columnar formed product (diameter: about 2 cm, length: about 30 cm) (which is an imitation cheese).

The product thus obtained was packed with a film in order to prevent evaporation of moisture and kept in a refrigerator at lower than 10° C. for 24 hours. Thereafter, the properties of the formed product of a microfibrillar milk protein were evaluated in terms of orientation and microfibrillar properties (degree of the microfibril formation). The reason why the evaluation of properties was carried out after keeping at lower than 10° C. is that foods to be refrigerated are usually maintained under the same condition as in the conventional distribution system.

The evaluation was carried out as follows:
Orientation property:

◎: When a formed product (a columnar product of a diameter of about 2 cm and a length of about 30 cm) was torn in the longitudinal direction from one end thereof, it could be smoothly torn from one end to the other end without breaking at the middle.

o: The formed product could be torn, but was broken once between both ends.

Δ: It was somewhat difficult to tear the product, and it was broken twice or more between both ends.

x: It was substantially impossible to tear the formed product, that is, it was broken in short pieces randomly.

Microfibrillar property:

A: A microfibrillar structure was observed in more than 90% area within the formed product with a microscope.

B: The microfibrillar structure was observed in 50 to 90% area within the formed product.

C: The microfibrillar structure was observed merely in less than 50% area within the formed product.

D: There was observed substantially no microfibrillar structure.

The desired formed food product of the present invention should comprise a bundle of microfibrillar milk protein and hence the preferred product should be evaluated ◎ in the orientation property and A or B in the microfibrillar property, more preferably as ◎ in the orientation property and A in the microfibrillar property.

In order to experiment the effects of amounts of the dehydrating agent and dispersant on these properties, the above tests were carried out by varying the amounts of sodium chloride and dextrin. The resulting data were plotted in the accompanying FIG. 1, where abscissa axis means the amount of sodium chloride and the ordinate axis means the amount of dextrin. The evaluation of microfibrillar property was shown by the symbols A to D and the evaluation of orientation property was shown on the shoulder of these symbols A to D, and further, the area of the amounts of dehydrating agent and dispersant satisfying the excellent orientation property (◎) and microfibrillar property (A or B) is enclosed with a real line and the particularly excellent area is shadowed with oblique lines.

Figure 1:
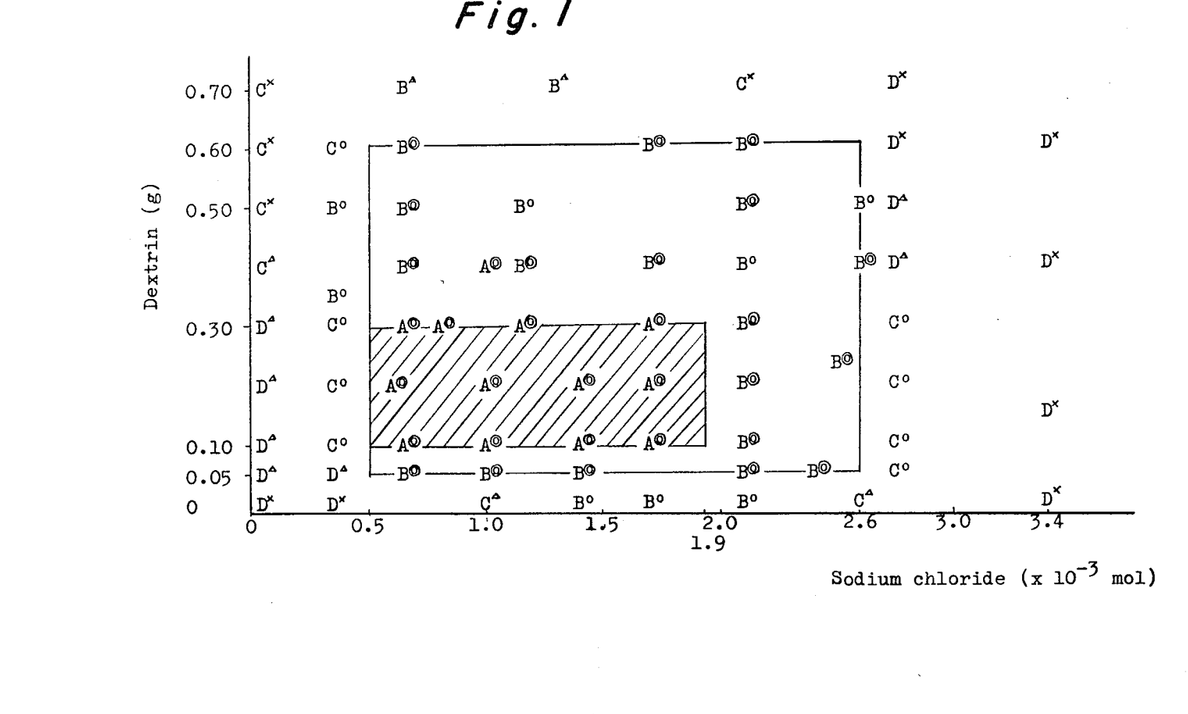

As is clear from the above experimental data shown in FIG. 1, when a comparatively soft product like an imitation cheese is obtained, it is preferable to use the dehydrating agent in an amount of $0.5\times10^{-3}$ to $2.6\times10^{-3}$ mol, more preferable $0.5\times10^{-3}$ to $1.9\times10^{-3}$ mol, per 1 g of the aqueous gel of a milk protein (water content: 65% by weight) and the dispersant in an amount of 0.05 to 0.6 g, more preferably 0.1 to 0.3 g, per 1 g of the aqueous gel of a milk protein (water content: 65% by weight).

Experiment 2

To an aqueous gel of a milk protein (water content: 65% by weight, 100 g) were added lactose (35 g (0.1 mol), as a dehydrating agent) and sodium caseinate (25 g, as a dispersant), and the mixture was uniformly mixed at 55° C., and thereto was added a palm kernel/coconut hardened mixed oil (melting point: 34° C.) in various amounts as shown in Table 1. The mixture was formed into a columnar product (diameter: about 2 cm, length: about 40–60 cm) in the same manner as described in Experiment 1, and the orientation and microfibrillar properties thereof were evaluated likewise. Besides, the chewing property (degree of plasticity) was also tested by 10 panellists. The evaluation was done as follows:

Chewing property:

1: All panellists evaluated that the product had sufficient texture and was flexible without feeling of watery taste or dry taste.

2: Four to five panellists complained watery taste or dry taste (inferior flexibility).

3: All panellists complained watery taste or dry taste (no flexibility).

The above test results are shown in Table 1.

TABLE 1

| Amounts of additives per 100 g of the aqueous gel of milk protein (water content: 65% by weight) | | | Evaluation | | |
|---|---|---|---|---|---|
| Lactose (g) | Sodium caseinate (g) | Mixed oil (g) | Orientation property | Microfibrillar property | Chewing property |
| 35 (0.1 mol) | 25 | 0 | ⊙ | A | 3 |
| 35 (0.1 mol) | " | 5 | ⊙ | A | 2 |
| 35 (0.1 mol) | " | 10 | ⊙ | A | 1 |
| 35 (0.1 mol) | " | 30 | ⊙ | A | 1 |
| 35 (0.1 mol) | " | 40 | ⊙ | B | 1 |
| 35 (0.1 mol) | " | 50 | ⊙ | B | 1 |
| 35 (0.1 mol) | " | 55 | △ | B | 1 |
| 35 (0.1 mol) | " | 60 | x | B | 1 |
| 35 (0.1 mol) | " | 70 | x | C | 1 |

As is clear from the data shown in Table 1, when the fats and oils were added in an amount of 0.1 g or more per 1 g of the aqueous gel of a milk protein (water content: 65% by weight), the product had excellent texture on chewing without feeling of watery taste or dry taste. The excellent texture will be owing to the coating of microfibrils with the fats and oils. On the other hand, when the fats and oils were used in an amount of more than 0.5 g per 1 g of the aqueous gel, it resulted disadvantageously in inferior orientation property of the product.

Experiment 3

To an aqueous gel of a milk protein (water content: 65% by weight, 100 g) was added a powder (40 mesh, 50 g of a commercially available chocolate having the components as shown in Table 2) at 55° C., and the mixture was mixed well and then formed into a columnar product (diameter: about 2 cm, length: about 40 cm, 150 g).

The product thus obtained was packed so as to prevent evaporation of moisture and kept in a refrigerator at lower than 10° C. for 24 hours. Thereafter, the product was torn at lower than 10° C. As a result, fine microfibrillar structure was sufficiently observed and it was well orientated, and hence, it could be torn from one end to the other end without breaking. Besides, when the product was chewed, it had a texture different from chocolate. When the product was kept at lower than 10° C. for a long period of time, the microfibrillar structure was not substantially changed until it rotted.

TABLE 2

| Components of chocolate | | | |
|---|---|---|---|
| Kind | Amount (g per 100 g of whole chocolate) | Function Kind | Function Amount |
| Sucrose + lactose | 59 | as a dehydrating agent | 59 g (0.173 mol) |
| Protein originated from cocoa mass + sodium caseinate + whey protein | 10 | as a dispersant | 20 g |
| Carbohydrates such as coarse fibers originated from cocoa mass | 10 | | |
| Cocoa butter + milk fats | 20 | as fats & oils | 20 g |
| Water, etc. | 1 | — | — |

Experiment 4

An about 20% aqueous casein solution (pH: 7.7, 500 g) was maintained at 55° C. and thereto was added a mixture of coconut hardened oil and palm kernel hardened oil (25 g), and the mixture was stirred to give a homogeneous mixture. To the mixture was added a calcium mixture (as a polyvalent metallic ion) of anhydrous calcium chloride (4.4 g) and calcium lactate pentahydrate (15.6 g), and the mixture was stirred at the same temperature to give a micelle of calcium caseinate. A protease (milkozyme, 0.01 g) was added to and uniformly dispersed in the micelle at the same temperature as above, and the mixture was maintained at the same temperature for 90 minutes to give an aqueous gel of a milk protein (about 380 g, water content: 65% by weight).

The aqueous gel thus obtained (100 g) was heated to a given temperature as shown in Table 3 and thereto was added slowly a mixture of sodium chloride (as a dehydrating agent) and sodium caseinate (as a dispersant) in an amount as shown in Table 3 which were previously homogeneously mixed. At this stage, the dispersibility of additives into the aqueous gel and also the degree of release of water from the mixture were evaluated as is shown below. The mixture thus obtained was charged into a small size of hopper provided with a steam jacket and also a nozzle (slit width: 5 mm, width: 30 mm, length: 100 mm) at the bottom and heated. Thereafter, the mixture was extruded through the nozzle under air pressure to form a sheet-like product (thickness: about 3 mm, width: about 20 mm, length: about 120 mm). This product was subjected at room temperature to the evaluation of orientation and microfibrillar properties in the same evaluation standard as in Experiment 1.

The evaluation of dispersibility of additives and degree of release of water were carried out as follows:

Dispersibility of additives:

a: The additives could easily uniformly be mixed and dispersed into the aqueous gel within a short period of time (i.e. within 5 minutes).

b: Although the additives could not uniformly be dispersed into the aqueous gel within a short period of time, it could be done when the mixing time was somewhat prolonged.

c: While the mixture became viscous during the mixing of the additives, all additives could be dispersed (but not uniformly) into the aqueous gel when the mixing time was prolonged.

d: The mixture became highly viscous on the way of adding the additives, and it was impossible to admix the remaining additives into the gel.

Degree of release of water:

—: No separation of released water was observed.

+: A slight amount (i.e. less than 5% by weight) of released water was present without being absorbed in the mixture.

++: A large amount (more than 5% by weight) of released water was present in the mixture.

The above results are shown in Table 3.

As was mentioned in Experiment 1, when a dehydrating agent was added in an amount of about $2.8 \times 10^{-3}$ mol per 1 g of an aqueous gel of a milk protein and mixed at 80° C. or lower, the obtained products showed an orientation property of o–x and a microfibrillar property of C–D, and further, when sodium chloride was used in an amount of $3.0 \times 10^{-3}$ mol, the products

TABLE 3

| Amount of additives per 1 g of aqueous gel of milk protein (water content: 65% by weight) | | Temperature in mixing and forming steps (°C.) | Evaluation | | | |
|---|---|---|---|---|---|---|
| | | | At mixing stage | | Properties of formed product | |
| Sodium chloride ($\times 10^{-3}$ mol) | Sodium caseinate (g) | | Dispersibility | Degree of released water | Orientation | Microfibrillar property |
| 1.6 | 0.3 | 95 | a | − | Δ | C |
| 1.9 | 0 | " | a | ++ | Δ | C |
| " | 0.1 | " | a | + | Δ | C |
| " | 0.3 | " | a | − | Δ | C |
| " | 0.5 | " | a | − | Δ | C |
| " | 0.7 | " | a | − | Δ | D |
| 2.2 | 0 | " | a | ++ | Δ | B |
| " | 0.1 | " | a | + | o | B |
| " | 0.3 | " | a | − | ⊙ | A |
| " | 0.5 | " | a | − | ⊙ | B |
| " | 0.7 | " | a | − | o | D |
| 2.8 | 0.2 | " | a | + | ⊙ | B |
| " | 0.4 | " | a | − | ⊙ | A |
| " | 0.6 | " | a | − | o | B |
| 3.5 | 0.03 | " | a | ++ | Δ | C |
| " | 0.1 | " | a | + | o | B |
| " | 0.3 | " | a | − | ⊙ | A |
| " | 0.5 | " | a | − | ⊙ | B |
| " | 0.7 | " | b | − | o | D |
| 4.0 | 0.2 | " | a | + | ⊙ | B |
| " | 0.4 | " | a | − | ⊙ | A |
| " | 0.6 | " | b | − | o | B |
| 5.0 | 0.03 | " | a | ++ | Δ | C |
| " | 0.1 | " | a | + | o | C |
| " | 0.3 | " | a | − | o | B |
| " | 0.5 | " | b | − | o | C |
| 5.5 | 0.1 | " | b | + | Δ | C |
| " | 0.3 | " | b | + | Δ | C |
| " | 0.5 | " | c | − | Δ | D |
| " | 0.7 | " | c | − | x | D |
| 3.0 | 0.1 | 75 | c | + | Δ | C |
| " | 0.3 | " | c | − | Δ | C |
| " | 0.5 | " | c | − | Δ | C |
| 4.0 | 0.1 | 75 | d | + | | |
| " | 0.3 | " | d | − | | |
| " | 0.5 | " | d | − | | |
| 2.0 | 0.1 | 85 | a | + | o | C |
| " | 0.3 | " | b | − | o | B |
| " | 0.5 | " | b | − | o | C |
| 3.5 | 0.1 | " | b | + | o | B |
| " | 0.3 | " | b | − | ⊙ | A |
| " | 0.5 | " | b | − | o | B |
| 5.5 | 0.1 | " | d | ++ | | |
| " | 0.3 | " | d | + | | |
| " | 0.5 | " | d | − | | |
| 3.5 | 0.1 | 105 | a | + | o | C |
| " | 0.3 | " | a | + | o | B |
| " | 0.5 | " | a | − | o | C |
| 5.5 | 0.1 | " | b | ++ | x | D |
| " | 0.3 | " | c | + | Δ | D |
| " | 0.5 | " | c | − | Δ | C |
| 3.5 | 0.1 | 120 | a | + | o | C |
| " | 0.3 | " | a | + | o | C |
| " | 0.5 | " | a | − | o | C |
| 5.5 | 0.1 | " | b | ++ | Δ | C |
| " | 0.3 | " | b | + | Δ | C |
| " | 0.5 | " | c | − | Δ | C |
| 3.5 | 0.1 | 125 | a | ++ | x | D |
| " | 0.3 | " | a | + | x | D |
| " | 0.5 | " | a | − | x | D |
| 5.5 | 0.1 | " | b | ++ | x | D |
| " | 0.3 | " | b | + | x | D |
| " | 0.5 | " | b | − | x | D | showed an orientation property of Δ and a microfibrillar property of C as is shown in Table 3. However, when the temperature in mixing and forming steps was raised to, for example, 95° C. even in these amounts of the dehydrating agent, the obtained products showed an orientation property of ⊙-o and a microfibrillar property A-C.

Thus, both orientation property and microfibrillar property of the formed product were improved by raising the temperature in the mixing and forming steps. However, when the dehydrating agent was used in a larger amount such as $5.5 \times 10^{-3}$ mol per 1 g of an aqueous gel of a milk protein, as is shown in Table 3, even if the temperature was raised from 95° C. to 105° C., the mixing could not uniformly be done, or the formed products showed inferior orientation property of Δ-x and inferior microfibrillar property of C-D, even though the mixing was done uniformly.

Moreover, as is clear from the data shown in Table 3, the upper limit of the temperature in the mixing and forming steps was 120° C. in order to obtain the desired excellent formed product in the amount range of a dehydrating agent suitable for obtaining a comparatively hard product, and when the temperature was 125° C., the obtained products showed bad orientation property of x and bad microfibrillar property of D. Besides, as to the lower limit of the temperature, the desirable product was obtained by treating at 85° C., but when the temperature was 75° C., the additives were hardly dispersed into the aqueous gel and the obtained products showed bad orientation property of Δ-x. Thus, in case of using a larger amount of a dehydrating agent and a specified amount of a dispersant in order to produce a comparatively hard food product, the temperature is preferably in the range of 80° to 120° C., more preferably 85° to 100° C.

It is also clear from the data shown in Table 3 that in case of using a comparatively larger amount of a dehydrating agent, when a dispersant was used in such a smaller amount as less than 0.05 g per 1 g of an aqueous gel of a milk protein, the dispersant exhibited insufficiently the ability of absorbing the released water to give a formed product having inferior orientation and being too hard, even though the dehydrating agent was used in a suitable amount, and further that when a dispersant was used in such a larger amount as more than 0.7 g, the formed product showed bad microfibrillar property, while the released water was well absorbed.

Accordingly, when a comparatively hard product like imitation jerky is obtained, it is preferable to use the dehydrating agent in an amount of $1.9 \times 10^{-3}$ to $5.5 \times 10^{-3}$ mol, more preferably $2.2 \times 10^{-3}$ to $4.0 \times 10^{-3}$ mol, per 1 g of an aqueous gel of a milk protein (water content: 65% by weight) and the dispersant in an amount of 0.05 to 0.6 g, more preferably 0.15 to 0.5 g, per 1 g of an aqueous gel of a milk protein (water content: 65% by weight) and also to select the temperature in the mixing and forming steps in the range of 80° to 120° C., more preferably 85° to 100° C.

As is explained above, the method of the present invention can give the desired formed food products of microfibrillar milk protein having a wide range of qualities from a comparatively soft food product (e.g. imitation cheese) to a comparatively hard food product (e.g. imitation jerky) by simple steps without any specific operation such as stabilization and neutralization and hence without loss of materials during the treatment like in the known methods. However, the formed food product obtained by the present invention has excellent balance of amino acids and excellent digestibility and also has unique texture owing to the microfibrillar structure. Besides, the formed product can easily be processed (e.g. seasoning, flavoring, etc.) to give various shaped food products having various tastes, and also, by controlling the water content of the formed product, there can be obtained foods products being from soft to hard qualities.

The present invention is illustrated by the following Examples, wherein some representative examples of a dehydrating agent, a dispersant and fats and oils are used, but it should not be construed to be limited thereto, that is, other various additives can also give the desired formed product likewise.

EXAMPLE 1

A 20% by weight aqueous casein solution (pH: 7.7, 500 g) was maintained at 55° C. and thereto was added a calcium salt mixture (as a polyvalent metallic ion) of anhydrous calcium chloride (4 g) and calcium lactate dihydrate (14 g), and the mixture was stirred at the same temperature to give a micelle of calcium caseinate. A protease, milkozyme (0.11 g) was added to and uniformly dispersed into micelle, and the mixture was maintained for 60 minutes to give an aqueous gel of a milk protein (water content: 65% by weight, 270 g).

The aqueous gel thus obtained (100 g) was mixed with a commercially available cheese powder (35 g) having the components as shown in Table 4 in a small kneader provided with a jacket at 55° C. and the mixture was stirred for 30 minutes. The resulting uniform mixture of the gel and cheese was extruded at 60° C. and under a pressure of 2 kg/cm² to form a columnar product having a diameter of about 2 cm.

The formed product thus obtained was packed so as to prevent evaporation of moisture and kept at 10° C. for 24 hours. The properties of the microfibrillar product were evaluated in the same manner as described in Experiment 1. As a result, it showed an orientation property of ⊙ and a microfibrillar property of A. Besides, the formed product contained microfibrils of milk protein in the form of a bundle in the longitudinal direction, and when it was torn, it was similar to a dried cuttlefish, and further, it had a texture like pork meat when chewed.

TABLE 4

| Components of cheese powder | | | |
|---|---|---|---|
| Kind | Amount (g per 100 g of cheese powder) | Function Kind | Amount |
| Milk protein | 31.3 | As a dispersant | 31.3 g |
| Milk fats | 46.8 | As fats & oils | 46.8 g |
| Lactose | 2.1 | As a dehydrating agent | $6.1 \times 10^{-3}$ mol |
| Sodium salt (as NaCl) | 8.9 | | 0.15 mol } 0.21 mol |
| Calcium salt (as CaCl$_2$) | 5.7 | | 0.05 mol |
| Water | 5.2 | — | — |

REFERENCE EXAMPLE 1

The above Example 1 was repeated except that the temperature in the mixing step was changed from 55° C.

to 90° C. As a result, the microfibrillar structure disappeared significantly due to heating, and the formed product showed an orientation property of Δ and a microfibrillar property of C.

REFERENCE EXAMPLE 2

In the same manner as described in Example 1, the aqueous gel (100 g) was mixed with a commercially available Cheddar cheese powder (35 g) having the components as shown in Table 5, and a formed product was obtained likewise. When the properties of this product were evaluated likewise, it showed an orientation property of Δ and a microfibrillar property of C.

TABLE 5

| Components of Cheddar cheese powder | | | |
|---|---|---|---|
| Kind | Amount (g per 100 g of Cheddar cheese) | Function | |
| | | Kind | Amount |
| Milk protein | 42 | As a dispersant | 42 g |
| Milk fats | 48 | As fats & oils | 48 g |
| Lactose | 0.5 | As a dehydrating agent | $1.5 \times 10^{-3}$ mol |
| Sodium salt (as NaCl) | 3.7 | | 0.06 mol } 0.08 mol |
| Calcium salt (as CaCl$_2$) | 2.0 | | 0.018 mol |
| Water | 3.8 | — | — |

EXAMPLE 2

In the same manner as described in Reference Example 2 except that a mixture of the Cheddar cheese powder (35 g) used therein and sodium chloride (3 g, 0.05 mol) was used instead of the Cheddar cheese powder alone, there was obtained a formed product which showed an orientation property of ⊙ and a microfibrillar property of A. When this product was chewed, it had a taste of a cheese-like food being somewhat salty.

EXAMPLE 3

The same aqueous gel of a milk protein (water content: 65% by weight, 100 g) as prepared in Example 1 was mixed with stirring with a pre-mixture (45 g) of additives as shown in Table 6 in a small kneader, and the mixture was stirred at 60° C. for 30 minutes to give an approximately homogeneous gel mixture.

TABLE 6

| Additives | | Function | |
|---|---|---|---|
| Kind | Amount | Kind | Amount |
| Sodium caseinate | 15 g | As a dispersant | 17 g |
| Sorbitol powder | 10 g | As a dehydrating agent | 0.055 mol |
| Meat extract powder (commercial product) | (totally 10 g) | | |
| Crude protein | 2 g | *1 | |
| Crude fats & oils | 2.6 g | *2 | |
| NaCl | 1.5 g | As a dehydrating agent | 0.026 mol } 0.11 mol |
| Calcium salt (as CaCl$_2$) | 1.8 g | | 0.016 mol |
| Sorbitol | 1.6 g | | |
| Water | 0.5 g | — | $8.8 \times 10^{-3}$ mol |
| Mixture of palm kernel hardened oil/coconut hardened oil | 10 g | As fats & oils | 12.6 g |

*1 It functions as a dispersant and is included in the amount of the function.
*2 It functions as fats and oils and is included in the amount of the function.

The gel mixture obtained above was extruded at 65° C. under a pressure of 3 kg/cm$^2$ to give a sheet-like formed product (thickness: about 3 mm, width: about 35 mm).

The properties of this product were evaluated likewise. As a result, it showed an orientation property of ⊙ and a microfibrillar property of A. The product had an appearance similar to animal meat and had an excellent elasticity owing to the highly orientated microfibrillar structure thereof.

EXAMPLE 4

To a skim milk (10 liters) cooled at 5° C. was added with stirring a 10% aqueous calcium chloride solution (80 ml), and the mixture (pH: 5.0) was maintained at 60° C. for 30 minutes to give an aqueous gel of a milk protein (water content: 65% by weight, about 900 g).

To the aqueous gel (100 g) were added lactose (40 g, 0.12 mol), dextrin (30 g) and butter oil (15 g), and the mixture was mixed well at 50° C. for 30 minutes, and then was formed at 55° C. under a pressure of 1.5 kg/cm$^2$ to give a columnar formed product (diameter: about 2 cm).

The properties of the product were evaluated likewise. As a result, it showed an orientation property of ⊙ and a microfibrillar property of A. When it was chewed, it showed flexible and smooth feeling and further showed mild sweetness owing to lactose, and hence, it is suitable as a milk cake. Besides, when this columnar product was seasoned with a pineapple flavor, the product was similar to a cake made from a pineapple.

EXAMPLE 5

A 20% by weight aqueous casein solution (pH: 7.7, 500 g) was maintained at 55° C. and thereto was added a mixture of palm kernel hardened oil and coconut hardened oil (25 g) and the mixture was stirred. To the mixture was further added with stirring at the same temperature a calcium salt mixture (as a polyvalent metallic ion) of anhydrous calcium chloride (4.4 g) and calcium lactate pentahydrate (15.6 g) to give a micelle of calcium caseinate. A protease, milkozyme (0.01 g) was added to and uniformly dispersed into the micelle, and the mixture was maintained for 90 minutes to give an aqueous gel of a milk protein (water content: 65% by weight, 380 g).

The aqueous gel thus obtained (100 g) was mixed with a pre-mixture (79.8 g) of additives as shown in Table 7 in a small mixer provided with a stirrer, and the mixture was stirred at 93° C. for 5 minutes to give a uniform gel mixture. In this mixture, no release of water was observed.

TABLE 7

| Additives | | Function | |
|---|---|---|---|
| Kind | Amount | Kind | Amount |
| Meat extract powder | (Totally 20 g) | | |
| Crude protein | 3.2 g | As a dispersant | Dispersant: 33.2 g |

TABLE 7-continued

| Additives | | Function | |
|---|---|---|---|
| Kind | Amount | Kind | Amount |
| Crude fats | 3.8 g | As fats & oils | |
| Sodium chloride | 5.3 g | As a dehydrating agent | Dehydrating agent: 0.28 mol |
| Sorbitol | 3.2 g | As a dehydrating agent | |
| Crude ash (as CaCl$_2$) | 3.5 g | As a dehydrating agent | Fats & Oils: 11.8 g |
| Water | 1.0 g | — | |
| Sodium caseinate | 30 g | As a dispersant | |
| Sorbitol powder | 15 g | As a dehydrating agent | |
| Sodium chloride | 2.5 g | As a dehydrating agent | |
| Sodium glutamate | 3 g | As a dehydrating agent | |
| Coconut · palm kernel hardened oils | 8 g | As fats & oils | |
| Seasoning | 1 g | — | |
| Smoke flavor | 0.3 g | — | |

The gel mixture thus obtained was charged into a small hopper provided with a steam jacket and a plate-shaped nozzle (thickness: 5 mm, width: 30 mm, length: 100 mm) at the bottom, and maintained for 30 minutes with heating, and then extruded from the nozzle at a liquid temperature of 92° C. under an extrusion pressure of 2.5–3 kg/cm$^2$ to give a sheet-like formed product (thickness: about 3 mm, width: about 20 mm).

The properties of the formed product thus obtained were evaluated likewise. As a result, it showed an orientation property of ⊙ and a microfibrillar property of B. When it was chewed, it showed excellent texture with high elasticity and showed good taste similar to beef meat. Moreover, when the sheet-like formed product was dried with air at 40° C. for 4 hours, there was obtained a food similar to a jerky (water activity: 0.72 water content: 20%). This dried product could be kept at room temperature for a long period of time without tainting and also without changing of the microfibrillar structure before drying. Besides, when it was chewed, it showed excellent texture and taste and was similar to a jerky beef.

REFERENCE EXAMPLE 3

The above Example 5 was repeated except that the liquid temperature in the step of mixing of the gel and the additives was changed from 92° C. to 75° C. As a result, the mixture become highly viscous on the way of adding the additives, and hence, it was difficult to uniformly disperse all the additives into the gel.

The mixture thus obtained (while it was insufficiently mixed) was charged into a hopper and heated. When the liquid temperature reached to 75° C., the mixture was forcibly extruded under a pressure of 4–5 kg/cm$^2$ to form a sheet-like formed product in the same manner as in Example 5. The resulting formed product showed an orientation property of x and a microfibrillar property of C.

REFERENCE EXAMPLE 4

The same aqueous gel (100 g) as used in Example 5 was mixed with stirring with additives as used in Example 5 in a pressure vessel provided with a stirrer at a liquid temperature of 125° C. for 5 minutes to give a uniform mixture. The mixture thus obtained was charged into a small hopper as used in Example 5, and after 20 minutes, the mixture was extruded at a liquid temperature of 125° C. under a pressure of 2.0 kg/cm$^2$ to give a sheet-like formed product (thickness: about 3 mm, width: about 20 mm).

The properties of the product were evaluated likewise. As a result, it showed an orientation property of x and a microfibrillar property of D. The product had deep red color. Besides, when it was chewed, it had a unique, undesirable bitter taste.

EXAMPLE 6

The same aqueous gel (100 g) as used in Example 5 was mixed with a pre-mixture (76.3 g) of additives as shown in Table 8, and the mixture was extruded under the same conditions as in Example 5 to give a sheet-like formed product (thickness: about 3 mm, width: about 20 mm). When the properties of the formed product were evaluated likewise, it showed an orientation property of
and a microfibrillar property of B. Besides, when it was chewed, it showed a texture similar to animal meat and also favorable crab-like flavor.

TABLE 8

| Additives | | Function | |
|---|---|---|---|
| Kind | Amount | Kind | Amount |
| Crab extract powder | (Totally 20 g) | | |
| Crude protein | 3.2 g | As a dispersant | Disperant: 38.2 g |
| Crude fats | 1 g | As fats & oils | |
| Crude ash (as NaCl) | 4.8 g | As a dehydrating agent | Dehydrating agent: 0.32 mol |
| Dextrin | 10 g | As a dispersant | |
| Water | 1 g | — | Fats & oils: 7 g |
| Sodium caseinate | 25 g | As a dispersant | |
| Sorbitol | 10 g | As a dispersant | |
| Glycerin | 7 g | As a dispersant | |
| Sodium chloride | 5 g | As a dispersant | |
| Sodium glutamate | 3 g | As a dispersant | |
| Coconut · palm kernel hardened oil | 6 g | As fats & oils | |
| Crab flavor | 0.3 g | — | |

What is claimed is:

1. A method for the production of a formed food product of a microfibrillar milk protein, which comprises mixing an aqueous gel of a latently microfibrillar milk protein comprising mainly calcium caseinate with a dehydrating agent and a dispersant in an amount of $0.5 \times 10^{-3}$ to $5.5 \times 10^{-3}$ mol and 0.05 to 0.6 g, respectively, each per 1 g of the aqueous gel of a milk protein having a water content of 65% by weight at a temperature of 40° to 120° C., and forming the mixture at the same temperature range to obtain a product having microfibrillar structure.

2. A method according to claim 1, wherein the temperature in the mixing and forming steps is in the range of 40° to 80° C.

3. A method according to claim 2, wherein the dehydrating agent is used in an amount of $0.5 \times 10^{-3}$ to $2.6 \times 10^{-3}$ mol.

4. A method according to claim 3, wherein the amounts of the dehydrating agent and the dispersant are in the range of $0.5 \times 10^{-3}$ to $1.9 \times 10^{-3}$ mol and 0.1 to 0.3 g., respectively, each per 1 g of the aqueous gel of a milk protein.

5. A method according to claim 1, wherein the temperature in the mixing and forming steps is in the range of 80° to 120° C.

6. A method according to claim 5, wherein the temperature is in the range of 85° to 100° C.

7. A method according to claim 5 or 6, wherein the dehydrating agent is used in an amount of $1.9 \times 10^{-3}$ to $5.5 \times 10^{-3}$ mol.

8. A method according to claim 5 or 6, wherein the dehydrating agent is used in an amount of $2.2 \times 10^{-3}$ to $4.0 \times 10^{-3}$ mol.

9. A method according to claim 8, wherein the amount of the dispersant is in the range of 0.15 to 0.5 g.

10. A method according to any one of claim 1, 2 or 3, wherein the dehydrating agent is a member selected from the group consisting of sodium chloride, calcium chloride, calcium lactate, magnesium chloride, monosaccharides, dissacharides, oligosaccharides, sugar alcohols, amino acids and their sodium salts, and lecithin, and the dispersant is a member selected from the group consisting of dextrin, starches, powdery cellulose, sodium alginate, gums, sodium caseinate, powdery egg white, isolated soy bean, gluten, blood plasma powder, and red blood corpuscle powder.

11. A method according to any one of claim 1, 2, or 3, wherein a fat and oil is additionally used in an amount of not more than 0.8 g per 1 g of the aqueous gel of a milk protein.

12. A method according to any one of claim 1, 2, or 3, wherein the dehydrating agent and dispersant is used in the form of a pre-mixture.

13. A method according to claim 12, wherein the pre-mixture further contains a member selected from the group consisting of cheese powder, chocolate powder, cocoa powder, fruit juice powders, yogurt powder, meat-like flavoring materials, fishes and shell fishes flavoring materials, skim milk powder, whole milk powder, whey powder, wheat powder, corn powder, rice powder, and powdery caramel.

* * * * *